April 18, 1944.   A. E. GESSLER ET AL   2,347,047
PRINTING METHOD AND PAPER FOR USE THEREIN
Filed Aug. 31, 1940
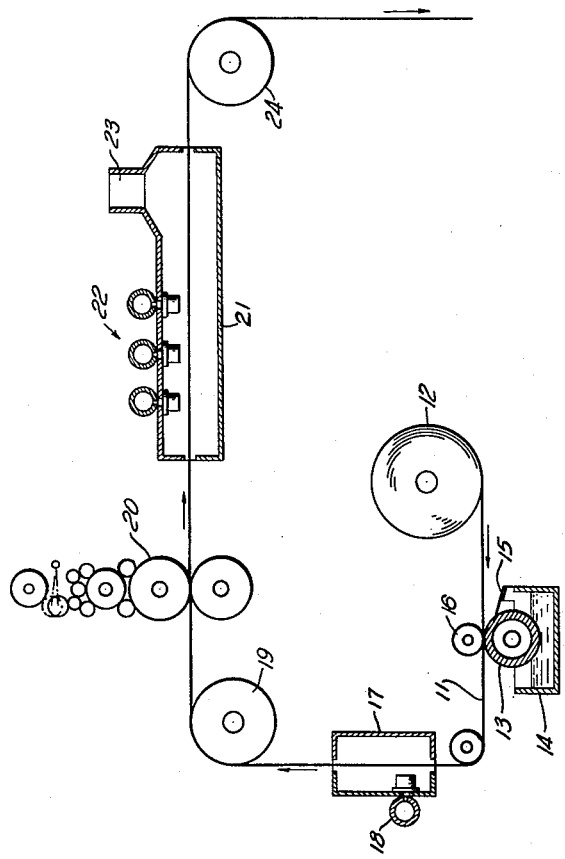
INVENTORS
ALBERT E. GESSLER
BY DOMINIC J. BERNARDI
Milton Zucker
ATTORNEY Patented Apr. 18, 1944

2,347,047

UNITED STATES PATENT OFFICE 2,347,047

PRINTING METHOD AND PAPER FOR USE THEREIN

Albert E. Gessler, New York, and Dominic J. Bernardi, Astoria, Long Island, N. Y., assignors to Interchemical Corporation, New York, N. Y., a corporation of Ohio Application August 31, 1940, Serial No. 354,994

2 Claims. (Cl. 117—38)

This invention relates to the art of printing, and has particular reference to a new and novel means of producing prints with a high finish (gloss) on cheap absorbent papers.

Printing on cheap absorbent papers is done largely for newspapers, the so-called "pulp" magazines, telephone directories, mail-order catalogues, and the like. For the cheapest work, as in newspapers, dispersions of pigment in mineral oil are used, drying being dependent entirely on absorption of the ink into the stock; no finish at all is obtained. In the mail-order catalogue and similar fields, however, an attempt is made to develop some finish by the use of inks containing drying oils and resins. However, results are inevitably poor, since the absorption of the ink into the paper prevents the attainment of any real finish. Such finish can be obtained by using conventional coated papers as a printing base; but these papers are far too expensive to permit their use in competition with the cheap absorbent papers.

The ordinary paper coatings, such as claycasein mixtures, involve too great an expense. Cheaper soluble silicate coatings have not proven successful on the light weight porous papers useful for cheaper printing (which weigh 20 to 40 pounds per ream of 3000 square feet) due to the fact that the coatings tend to crack, and flake from these light weight porous papers if applied in sufficiently heavy films to hold out the ink.

We have discovered that light weight porous papers may be successfully and economically coated so that prints of high finish may be obtained thereon, by surface coating the paper, preferably from an intaglio cylinder, with alkali silicate solutions which deposit from ¾ to 2 pounds per ream of dry alkali silicate on the paper.

The use of such low quantities of silicate is extremely important when coating light weight porous stock of the type of newspaper and catalogue paper; amounts of silicate in the form of surface coatings substantially in excess of 2 pounds per ream tend to produce coatings which crack.

The finish obtainable with such low quantities of silicate are due, we believe, to two factors. The intaglio application of the coating produces a coating structurally different from that produced with ordinary coating machines, in that the coating, being laid down in a screen pattern, has fewer points of contact with the paper and occupies more effective volume than a perfectly even coating of similar weight. This results in reducing the absorption of ink by the paper, thus enhancing the gloss.

The second factor in the high finish obtained is the retention of our coating on the surface of the paper, so that a maximum of silicate overlays the paper fibers, rather than penetrates into them. This surface effect can be obtained by drying the silicate coated paper directly after printing. It can also be obtained by using silicates with a high ratio of silica to metal oxide (3.2 to 1.0 or higher) in high concentrations, approaching within ten percent or so of the concentration at which the particular silicate forms a gel with water.

In the preferred practice of our invention we apply the coating material and the printing ink as a continuous operation, passing a web of porous paper through an intaglio printing couple which coats the web, then drying the coating, and then feeding the dry coated web through a conventional printing press.

The invention is particularly applicable to the printing of newspapers and catalogues with inks such as are described in the Gessler U. S. Patent No. 2,087,190, adapted to be set by the application of heat by processes such as are described in the Jeuck U. S. Patent No. 2,042,432 and the Helmer U. S. Patent No. 2,127,956. By the use of such inks on our coated papers, it is possible to produce newspapers which are free of the disadvantage of dullness, strike-through and loss of sharpness of outline so common in conventional practice, and to produce catalogues of markedly improved appearance, without substantial increase in cost.

A typical set up for the practice of our invention is shown in the accompanying diagrammatic drawing. A web 11 of typical porous news stock, weighing 32 pounds per ream, is unrolled from a reel 12. It passes through an intaglio printing couple comprising an etched cylinder 13 rotating in a fountain 14, with a doctor blade 15 and a cooperating impression cylinder 16. The cylinder 13 is prepared by etching an overall rectangular screen pattern, having 150 lines per linear inch, to a depth of about .0011 inch. The intaglio coating is applied by this cylinder, and is immediately set by passing it through a drying chamber 17 in which is provided an elongated ribbon gas burner 18 playing directly on the coating. The coated web, carrying about 1½ pounds of dry silicate per ream, is then cooled by passing over the cooling drum 19, and is then passed through a typographic printing unit 20, where a heat-setting ink is applied. The ink is dried in conventional fashion by passage through an oven 21 of the type shown in the Helmer Patent No. 2,127,956, having rows of burners 22 and a vent 23, and is finally cooled by the roll 24 before passing into a rewind or into a duplicate of the illustrated set up for printing on the second side.

In the practice of our process, the burners 18 and 22 should be so mounted that when the press stops, the burners are shut off and cooled to prevent scorching of the web; such an arrangement is disclosed in the Hess Patent No. 2,210,032, issued August 6, 1940. The impression cylinder 16 on the intaglio couple is preferably arranged to automatically move out of contact with the engraved cylinder when the press stops, while the engraved cylinder is allowed to rotate; this prevents drying of the silicate coating on the etched cylinder due to stoppage of the roll.

The coating applied by the cylinder 13 may be any alkali silicate depositing sufficient dry silicate, provided the web is run rapidly; the heater 18 dries the silicate before it has a chance to penetrate substantially. Because of difficulties which may occur on stoppage of the press, however, we prefer to use a silicate which tends to stay on top of the paper. Such silicates have $SiO_2 \cdot Na_2O$ ratios of the order of 3.2 to 1.0 or higher, and the silicate contents of the solutions are such that they become gels on the loss of only a small portion of their water. A sodium silicate having a silica-sodium oxide ratio of 3.2 to 1.0 gels at about 42% silicate content, and will yield a surface coating if used at a silicate content of about 30% or higher; a 3.9 ratio silicate will gel at about 34% solids, and will yield a surface coating, even when dried slowly, when the applied coating has a silicate content of 26% or more.

Preferably, where cheap papers are used, a small amount of tinting color is added to the silicate solution to reduce the tendency toward browning observable with these cheap papers. 0.5% ultramarine, or slightly higher percentages of white pigments such as blanc fixe, clay, whiting, or titanium dioxide, may be used.

The cylinder 13 is etched to deposit between ¾ and 2 pounds of dry silicate per ream. Lower quantities than ¾ pound do not hold the ink out well; while quantities in excess of 2 pounds per ream form heavy continuous films which crack on standing.

The finish imparted by our process to the inks is observable to some extent with ordinary slow drying linseed oil inks; but best results are obtainable with inks which may be dried quickly. A preferred type of these inks is described in the Gessler Patent No. 2,087,190; they comprise generally a dispersion of pigment in a vehicle comprising a binder and a solvent therefore which is substantially non-volatile at ordinary room temperatures, but which evaporates rapidly at temperatures of the order of 150° C. An ink of this type may be prepared from:

|  | Parts by weight |
|---|---|
| Carbon black | 15.6 |
| Stearin pitch | 2.5 |
| Varnish composed of 55 parts by weight zinc resinate, 45 parts by weight petroleum distillate (B. R. 239–280° C.) | 81.9 |

Other types of quick drying inks likewise give good results. Furthermore, other departures can be made from the examples without departing from the scope of the invention, which is defined in the claims.

What we claim is:

1. Newsprint stock of original high absorptive capacity for printing inks, and weighing between about 20 and 40 pounds to the ream, carrying a surface coating, showing the characteristic dot structure of a gravure cylinder, of water-soluble alkali silicate, the silica-alkali oxide ratio of which lies between 3.2 to 1.0 and the upper ratio limit at which water-solubility is still obtainable, the dry coating weighing between ¾ and 2 pounds per ream and being restricted to the outsides of the paper fibers at the surface of the paper, while the interior of the paper sheet and the interior of the surface fibers are substantially free of silicate, the surface coating being of such thinness because of its weight and method of deposition that it will not crack on bending of the paper, while sufficient to materially reduce the absorptivity of the paper.

2. The method of producing high finish printing on porous newspaper stock weighing between about 20 and 40 pounds to the ream, which comprises applying by gravure to the paper a relatively uniform non-cracking coating of an aqueous alkali silicate solution, the silica-alkali oxide ratio of which lies between 3.2 to 1.0 and the upper ratio limit at which water-solubility is still obtainable, in such thickness that a dry coating weight of between ¾ and 2 pounds per ream is obtained, drying the coating to obtain a film restricted to the outsides of the paper fibers at the surface of the paper, while the interior of the paper sheet and the interior of the surface fibers are substantially free of silicate, and thereafter printing the paper with an ink which comprises pigment, a binder, and a solvent substantially non-volatile at room temperatures but which evaporates rapidly at 150° C., and immediately after printing drying the ink with heat to obtain a printed news stock of highly improved finish as compared to that obtained from a similar ink of untreated news stock.

ALBERT E. GESSLER.
DOMINIC J. BERNARDI.